United States Patent
Greenway et al.

(10) Patent No.: US 9,912,882 B2
(45) Date of Patent: Mar. 6, 2018

(54) IMAGING APPARATUS AND METHOD

(71) Applicant: MBDA UK LIMITED, Stevenage Hertfordshire (GB)

(72) Inventors: Christopher Greenway, Filton (GB); Richard Charles Simmons, Stevenage (GB)

(73) Assignee: MBDA UK LIMITED, Hertfordshire (GB)

( * ) Notice: Subject to any disclaimer, the term of this patent is extended or adjusted under 35 U.S.C. 154(b) by 198 days.

(21) Appl. No.: 14/785,123

(22) PCT Filed: Apr. 16, 2014

(86) PCT No.: PCT/GB2014/051187
§ 371 (c)(1),
(2) Date: Oct. 16, 2015

(87) PCT Pub. No.: WO2014/170670
PCT Pub. Date: Oct. 23, 2014

(65) Prior Publication Data
US 2016/0088238 A1    Mar. 24, 2016

(30) Foreign Application Priority Data
Apr. 18, 2013 (GB) .................................. 1307116.2

(51) Int. Cl.
*H04N 5/33* (2006.01)
*G01J 3/02* (2006.01)
(Continued)

(52) U.S. Cl.
CPC ................ *H04N 5/33* (2013.01); *G01J 3/027* (2013.01); *G01J 3/0208* (2013.01);
(Continued)

(58) Field of Classification Search
CPC ............. G01J 2003/2826; G01J 3/0208; G01J 3/0224; G01J 3/0235; G01J 3/0264;
(Continued)

(56) References Cited

U.S. PATENT DOCUMENTS 5,847,755 A    12/1998  Wixson et al.
8,149,418 B2 *  4/2012  Tearney ............... A61B 5/0062
                                                        356/479

(Continued)

FOREIGN PATENT DOCUMENTS

WO    WO 2007/070306 A2    6/2007

OTHER PUBLICATIONS

Tominaga et al, Object recognition by multi-spectral imaging with a liquid crystal filter, 2000.*

(Continued)

*Primary Examiner* — Shan E Elahi
(74) *Attorney, Agent, or Firm* — Scully, Scott, Murphy & Presser, P.C.

(57) ABSTRACT

An imaging apparatus and method are provided for improving discrimination between parts of a scene enabling enhancement of an object in the scene. A camera unit is arranged to capture first and second images from the scene in first and second distinct and spectrally spaced apart wavebands. An image processing unit processes the images so captured and processes polarimetric information in the images to enable better discrimination between parts of the scene. An image of the scene, including a graphical display of the polarimetric information, may be displayed on a visual display unit thus enhancing an object in the scene for viewing by a user. Correlation parameters indicating, possibly on a pixel-by-pixel basis, the correlation between the (Continued)

actual image intensity at each angle of polarization and a modelled expected image intensity may be used to enhance the visibility of an object.

20 Claims, 4 Drawing Sheets

(51) Int. Cl.
*G01J 3/28* (2006.01)
*G01J 3/447* (2006.01)
*G01J 3/50* (2006.01)
*G01J 4/04* (2006.01)
*G06T 5/50* (2006.01)
*G06T 7/11* (2017.01)
*G02B 5/30* (2006.01)
*G02B 27/28* (2006.01)

(52) U.S. Cl.
CPC .......... *G01J 3/0224* (2013.01); *G01J 3/0235* (2013.01); *G01J 3/0264* (2013.01); *G01J 3/2823* (2013.01); *G01J 3/447* (2013.01); *G01J 3/50* (2013.01); *G01J 4/04* (2013.01); *G06T 5/50* (2013.01); *G06T 7/11* (2017.01); *G01J 2003/2826* (2013.01); *G02B 5/3058* (2013.01); *G02B 27/288* (2013.01); *G06T 2207/10036* (2013.01); *G06T 2207/10048* (2013.01); *G06T 2207/20224* (2013.01); *G06T 2210/61* (2013.01)

(58) Field of Classification Search
CPC .......... G01J 3/027; G01J 3/2823; G01J 3/447; G01J 3/50; G01J 4/04; G02B 27/288; G02B 5/3058; G06T 2207/10036; G06T 2207/10048; G06T 2207/20224; G06T 2210/61
USPC ....................................................... 348/164
See application file for complete search history.

(56) References Cited

U.S. PATENT DOCUMENTS

| | | | |
|---|---|---|---|
| 9,377,395 B2* | 6/2016 | Aharon | A61B 5/0077 |
| 2001/0053182 A1* | 12/2001 | Ishiyama | H04N 19/172 375/240.05 |
| 2005/0213815 A1* | 9/2005 | Garoutte | G06K 9/00362 382/171 |
| 2005/0264813 A1* | 12/2005 | Giakos | B82Y 20/00 356/369 |
| 2007/0057146 A1* | 3/2007 | Ashley | G06T 5/50 250/208.1 |
| 2007/0263899 A1* | 11/2007 | Garoutte | G06K 9/00362 382/103 |
| 2008/0029701 A1* | 2/2008 | Onozawa | B60Q 1/0023 250/332 |
| 2009/0021598 A1* | 1/2009 | McLean | G01J 3/02 348/222.1 |
| 2012/0013722 A1 | 1/2012 | Wong et al. | |
| 2013/0088612 A1* | 4/2013 | Imai | H04N 5/2254 348/222.1 |

OTHER PUBLICATIONS

International Preliminary Report on Patentability and Written Opinion dated Oct. 29, 2015 dated PCT/GB2014/051187.
International Search Report dated Jul. 30, 2014 issued in PCT/GB2014/051187.
GB Search Report dated Oct. 9, 2013 issued in GB1307116.2.
Tyo, Scott J. et al., "Review of passive imaging polarimetry for remote sensing applications", Applied Optics (Aug. 1, 2006), vol. 45, No. 22, pp. 5453-5469.
Innes et al., "Multispectral-Polarimetric Sensing for Detection of Difficult Targets", 5th EMRS DTC Technical Conference—Edinburgh 2008—B8, pp. 1-8.
Parsons, et al., "A LWIR Multispectral / Polarimetric Imager", 6th EMRS DTC Technical Conference—Edinburgh 2009, B2, pp. 1-5.
Parsons, et al., "A LWIR Polarimetric Imager", 5th EMRS DTC Technical Conference—Edinburgh 2008—B7, pp. 1-6.

* cited by examiner $$I_{data} = \begin{pmatrix} I_0 \\ I_{45} \\ I_{90} \\ I_{135} \end{pmatrix} \qquad \alpha = \begin{pmatrix} -\phi \\ \frac{\pi}{4} - \phi \\ \frac{\pi}{2} - \phi \\ \frac{3\pi}{4} - \phi \end{pmatrix}$$

$$I_{calc}(\alpha) = (I_{max} - I_{min}) \cdot \cos(\alpha)^2 + I_{min}$$

$$u = \sum \left[ (I_{data} - I_{calc}(\alpha))^2 \right]$$

$$v = \sum (I_{data}^2) - \frac{1}{4} \left( \sum I_{data} \right)^2$$

$$Cf = 1 - \frac{u}{v}$$

Fig.3

IMAGING APPARATUS AND METHOD

BACKGROUND OF THE INVENTION

The present invention concerns an imaging apparatus and corresponding method. More particularly, but not exclusively, this invention concerns an imaging apparatus, and a method, for improving discrimination between parts of scene. The invention also concerns a processing unit programmed for use in such an apparatus/method and a software product for so programming such a processing unit.

Across various imaging applications, there is a desire to better distinguish with the imaging system employed between an object of interest and other parts of the scene being viewed. Typically imaging systems of the prior art have considered detecting other wavelengths of radiation instead of visible light, for example, imaging systems based on the use of infra-red cameras, which can enhance any objects hotter than their local surroundings, for example objects which emit or reflect heat against a relatively cold background. Various regions of the infra-red spectrum being good for enhancing living animals or human beings and various other regions of the infra-red spectrum being better suited for "hotter" objects such as aircraft or other vehicles. Infra-red cameras are widely used for many such applications. There are also proposals for improving imaging techniques by comparing temporally separated images for changes in the image (therefore good for detecting moving objects against a static background—see for example U.S. Pat. No. 5,847,755). Passive imaging polarimetry has also been proposed for enhancing the information available from a remote sensor set-up (see for example, the paper by Scott et al, "Review of passive imaging polarimetry for remote sensing applications", 1 Aug. 2006/Vol. 45, No. 22/Applied Optics pages 5453 to 5469). There still exists however a desire to provide an improved means of better discriminating an object from other parts of a scene being viewed with an imaging system. Such a desire exists for example in relation to military applications where there is a desire to improve imaging techniques by suppressing background information in a scene whilst enhancing or emphasising target signatures, particular to assist a human-in-the-loop in perception and recognition of certain objects in a scene.

The present invention thus seeks to provide an improved imaging system.

SUMMARY OF THE INVENTION

The present invention provides according to a first aspect of the invention, an imaging apparatus for improving discrimination between parts of scene, for example to improve the better discrimination of an object in a scene, possibly enabling such an object to be better detected (and/or be more readily recognised by a human-in-the-loop) and/or to enhance one or more objects in the scene, for example to assist recognition of such objects by a human-in-the-loop. The imaging apparatus preferably comprises at least one camera arranged to capture a first image from the scene at a first region of wavelengths (preferably a first waveband). Said at least one camera is preferably also arranged to capture a second image from the scene at a second region of wavelengths (preferably a distinct second waveband). The apparatus includes an image processing unit for processing the images so captured. The imaging apparatus is so arranged that the images detected by the at least one camera include polarimetric information that can be extracted by the image processing unit. The image processing unit is advantageously arranged to use the polarimetric information to enable better discrimination between parts of the scene and for example better discrimination of an object from the scene.

It is advantageous to capture radiation from the scene at distinct and separate (spectrally spaced apart) wavebands, as radiation from different wavebands can provide different polarimetric (and non-polarimetric) information from the scene, thus facilitating better discrimination of the object from the scene. Polarimetric imaging offers the potential for suppressing background and enhancing target signatures. An advantage in the use of more than one waveband lies in the nature of the light received. For example, in the medium wave infrared (MWIR) region of the spectrum, it is believed that the polarisation is primarily composed of reflected ambient energy, whilst in the long wave infrared (LWIR) region it is believed that the polarised energy from object emission is likely to be more prominent than in the MWIR region. These two bands will thus often contain complementary information that can be utilised to improve better discrimination of the object from the scene than compared with using only polarimetric information captured within a single band. Proposals exist relating to detection of targets using multispectral polarimetric sensing in the short wave IR band (SWIR)—see for example, the paper by Innes et al "Multispectral-Polarimetric Sensing for Detection of Difficult Targets", but such are limited to analysis in a single band (in this paper the SWIR band).

Said at least one camera is preferably arranged to capture both images (preferably in both the first and second wavelength regions) without being subjected to any polarisation filter, grating or the like (not subject to any further polarisation step) and images which are captured at only a certain angle of polarisation. It may be possible to provide improved image discrimination via polarimetric information which is captured only at a single angle of polarisation. It may be that the imaging apparatus is used on an aircraft. In such a case much of the radiation reflected or emitted from the surface of the earth or objects thereon (e.g. where the background of the scene being viewed might be defined by the ground and/or a body of water), when received by said at least one camera, may if polarised be polarised in substantially the same direction. However, capturing radiation from the scene at more than one angle of polarisation is preferred.

The imaging apparatus may comprise a polarisation unit for allowing the polarisation of the radiation to be ascertained. The polarisation unit may be arranged to admit radiation at only one angle of polarisation at a time. The polarisation unit may be arranged to cause radiation at a discrete number (e.g. 1 to 10) of angles of polarisation to be admitted and separately detected, possibly at the same time. The polarisation unit may comprise a ¼ wave plate assembly for detecting the amount of non-linear polarisation (e.g. for detecting the amount of circular polarisation). The polarisation unit may comprise one or more polarisation filters. The polarisation unit may comprise one or more polarisation gratings.

The polarisation unit may be integrated with the camera. The camera may for example include a configurable polarisation filter/grating. The camera may include an array of detector elements for detecting radiation admitted into the camera from the scene being viewed with the camera. The polarisation unit may be defined by polarisation gratings/filters associated with each such detector element.

The polarisation unit may be configurable to admit radiation, at any one of a plurality (preferably at least four) of different angles of polarisation. Thus images of the scene may be captured by said at least one camera at each wavelength band of interest at a plurality (preferably at least four) different angles of polarisation. At each waveband, five images may thus be taken comprising four images at different angles of polarisation (for example at 0, 45, 90, 135 degrees) and a fifth image capturing the scene without any further polarisation. It will be appreciated of course that the fifth image may be generated by combining each of the four polarised images to generate an image equivalent to capturing the scene without any further polarisation. A polarisation filter of the polarisation unit may be arranged to adopt different positions (for example by means of being rotated) so as to admit radiation at the respective different angles of polarisation. The polarisation unit may comprise a rotatable wheel housing different filters corresponding to the different angles of polarisation. Conveniently the filters for the four angles of polarisation may be disposed in separate segments (e.g. quadrants) of the wheel so that a single revolution of the wheel exposes the camera to the four filters once only each. It will be appreciated that at least some of the filters positioned in the respective segments of the wheel may thus be disposed at different angles (as defined by the angle of polarisation imposed by the filter) relative to each other. Alternatively, the rotatable wheel may house only one or more filters such that the various angles of polarisation correspond directly to the angle of rotation of the wheel.

The polarisation unit may comprise a plurality of independently moveable filters, each corresponding to the different angles of polarisation, and moveable into and out of the field of view as desired.

There may be multiple cameras. Each camera could be arranged to detect radiation at a fixed angle of polarisation relative to other cameras. Each camera could be arranged to detect radiation within a single region of wavelengths (single waveband). An apparatus utilising multiple cameras may comprise one or more beam splitters to split radiation from the scene into separate beams of radiation for viewing by each such camera. It is however preferred to have a single camera, thus negating the need for such beam splitters for such a purpose.

The apparatus is preferably configured to capture images by stepping through different angles of polarisation. Preferably the rate of capture of such images is such that, in respect of each region of wavelengths, at least four images are captured at different polarisations over a period of time that is less than one second. This could for example be achieved by having a polarisation filter unit arranged to step through the different angles of polarisation. The rate of image capture may be greater than 10 Hz (10 images per second). The rate of stepping through the different angles of polarisation may correspond to the rate at which the camera captures images. Camera image capture rates may be higher than 20 Hz and possibly higher than 50 Hz. Several frames could be captured for the capture of each image, with the data for that image being averaged across the data for all frames. A single frame may be captured when capturing a given image at a given polarisation angle at a given waveband.

The image processing unit is advantageously arranged to compare a parameter concerning the polarisation of parts of the first image with an equivalent polarisation parameter of corresponding parts of the second image. The imaging apparatus may then display a representation of the image of the scene, where that a representation (preferably in the form of a single displayed image) comprises a graphical representation of the results of such a comparison. For example, different parts of the image displayed may be coloured differently, or otherwise graphically distinguished from other portions of the image, according to the differences/similarities between the polarisation parameter(s) ascertained for the corresponding parts of the first and second images, respectively.

The imaging apparatus may be so arranged that each of the images (for example each of the first and second images) captured is divided into an array of elements represented by data. The elements may correspond to pixels, but need not do so. It will therefore be appreciated that the images captured may be represented electronically by an array of pixels. One or more independent polarisation parameters may be assigned to each such element of each image. Thus the polarimetric information that can be extracted by the image processing unit may include one or more such polarisation parameters, preferably one or more such polarisation parameters per element of each image. One or more Stokes parameters may be assigned to each such element of each image. One of the polarisation parameters may relate to the ratio of polarised to non-polarised energy captured ("the proportion of polarisation")—preferably the ratio of linearly polarised to non-polarised energy captured—corresponding to that element of the image(s). One of the polarisation parameters may relate to the angle of polarisation of the polarised energy captured corresponding to that element of the image(s).

The image processing unit may be arranged to use the polarimetric information to calculate the proportion of polarisation of parts of the first and/or second image. The image processing unit may be arranged to use the polarimetric information to calculate the angle of polarisation of parts of the first and/or second image. The image processing unit may be arranged to compare the proportion of polarisation of parts of the first image with the proportion of polarisation of corresponding parts in the second image. For example, when elements of the images correspond to pixels, the image processing unit may be arranged to compare the proportion of polarisation at pixels in the first image with the proportion of polarisation at corresponding pixels in the second image. The image processing unit may be arranged to compare the angle of polarisation of parts (for example, pixels/elements) of the first image with the angle of polarisation of corresponding parts in the second image. The image processing unit is preferably arranged to compare two or more (and preferably three or more) independent polarisation parameters as between parts (for example, pixels/elements) of the first image and the second image. For example, the image processing unit could compare both the angle of polarisation and the proportion of polarisation as between pixels of the first image and the second image. Comparing two or more different polarisation parameters as between the first and second images may provide for better discrimination of features of the scene as compared to the case where just one polarisation parameter is considered.

As mentioned above, it is preferred that a single camera captures the first and second images. The imaging apparatus may be so arranged that the images captured by the single camera include at least four images captured at different angles of polarisation. The imaging apparatus is preferably so arranged that the first image captured is both spatially and temporally coherent with the second image that is captured. This is most easily achieved by use of a single camera. Cameras are currently available which have detector arrays, for example dual-layers, which can capture images at different wavebands where the images so captured are spatially and temporally coherent. It is preferred that the first and second images are captured within less than a millisecond of each other and more preferred that the first and second images are captured substantially simultaneously. The single camera may have distinct and separate detector arrays accommodated with the same single camera for capturing the first and second images, respectively. The single camera may a single detector array for capturing the first and second images.

It is preferred that the first region of wavelengths corresponds to a first waveband and that the second region of wavelengths corresponds to a second waveband, wherein the first and second wavebands are distinct and spectrally spaced apart from each other. Preferably the first and second wavebands are separated by more than 1 µm. It is preferred that one of the first and second wavebands represents radiation in the medium wave infrared (MWIR) region of the spectrum. It is preferred that one of the first and second wavebands represents radiation in the long wave infrared (LWIR) region of the spectrum. Preferably one of the first and second wavebands represents radiation in the MWIR region and the other of the second wavebands represents radiation in the LWIR region. For example, the first region of wavelengths may cover multiple wavelengths in the MWIR region, for example from 3 to 6 µm. The second region of wavelengths may cover multiple wavelengths in the LWIR region, for example, from 7.5 to 14 µm. The first region of wavelengths may cover multiple wavelengths in a first waveband extending from 3.5 to 5 µm. The second region of wavelengths may cover multiple wavelengths in a second waveband extending from 8 to 9.5 µm. The second waveband may alternatively be considered as extending from 7.5 to 12 µm. It may be the case that neither the first waveband nor the second waveband covers wavelengths in the region from 6 to 7.5 µm. The images captured by the camera(s) are preferably captured at distinct and separate wavebands. There may be a third waveband in which images are captured and for which polarimetric information is gathered/ascertained. The third waveband may cover a region of non-visible light. The SWIR region may for example be covered. The third waveband may cover wavelengths such that the first, second and third wavebands are all mutually distinct and spectrally spaced apart from each other. At least one image covering the visible light spectrum may be captured in addition to, or instead of, the image captured at the third waveband. Radiation may be detected at substantially all wavelengths across each respective waveband.

The apparatus may include a visual display unit. The visual display unit may be configured to display an image of the scene (for example, displaying the first and/or second images so captured), with or without enhancement added by the image processing unit. The image displayed may be enhanced by means of using a polarimetric parameter accorded to different elements of the image. For example, the image displayed may be enhanced by means of using the polarimetric angle accorded to different elements of the image. The image displayed may be enhanced by means of using the proportion of polarisation accorded to different elements of the image. The image displayed may be enhanced by means of a comparison of one or more polarisation parameters accorded to different elements of the first image as compared to corresponding elements of the second image. In any or all of these ways of enhancing the image displayed, the amount and/or type of enhancement may be arranged to be adjustable by the user (e.g. a human-in-the-loop). For example, it may be that the image processing unit is arranged to use the polarimetric information to enhance the image of the scene displayed by the visual display unit so as to provide better discrimination between parts of the scene, the enhancement added by the image processing unit being controllable by the user. Allowing a human-in-the-loop the ability to switch between multiple types of enhancement and/or to vary the amount of enhancement can quickly allow the user to recognise objects in a scene and also to select the best type and amount of enhancement for a particular type of scene.

The enhancement added by the image processing unit may be selected from a multiplicity of different types of enhancement. For example, there may be more than five different polarisation parameters or variables available for the user to adjust. By way of example, for the images captured relating to a given scene at least ten separate images could be taken, four at different polarisation angles at each waveband (i.e. a subtotal of eight images), a further non-polarised image at each waveband (i.e. a subtotal of two images) and, optionally, a further single image, preferably in the visible spectrum, being taken as a reference image. Thus, said at least ten separate images may represent ten different and independent sets of information about the scene, yielding at least ten different independent variables. Such variables could optionally be combined to provide the independently adjustable enhancements. The user may then have the option of varying display settings to give the best enhancement (or at least an improved enhancement) of the image displayed. Enhancement may for example be varied according to the lighting and atmospheric conditions relating to the scene and camera(s), the type of scene and which objects in the scene the user has particular interest in discriminating from other portions of the scene.

Thus, the visual display unit is advantageously configured to display an image of the scene in such a way as to provide a graphical display of the polarimetric information in the image thus affording a user better discrimination of parts of the scene. The apparatus may include a user interface via which the effect on at least part of an image of the scene displayed on the visual display unit of any one or more of a plurality of polarimetric parameters (for example the amount of enhancement contributed to the image by means of display/overlay of graphical representations—colouring for example—of said any one or more of the plurality of polarimetric parameters) can be adjusted by the user.

The image processing unit may be arranged to calculate a correlation parameter for each of a multiplicity of elements of the image. The correlation parameter may provide a measure of how well the measured polarisation values for each element of the image fit a mathematical model (a measure of whether the measured values are a good-fit as compared to the model, for example). For example, the images captured by the at least one camera may include a plurality (preferably at least four) images captured at different angles of polarisation (and possibly also captured at different times) thus allowing polarisation parameters to be calculated to define the model. The model may provide a means of predicting the intensity of image captured corresponding to each element when the image is captured at a given polarisation (for example providing a means of predicting the proportion of polarisation at a given element). The model may provide a means of predicting the angle of polarisation of energy captured corresponding to each element when the image is captured at a given polarisation. The model may make use of a sinusoidal model. The correlation parameter may concern the correlation between the actual polarisation image intensity detected for each element for each angle of polarisation at which measurements are made with the expected image intensity that would be predicted for each element for each angle of polarisation according to the corresponding calculated polarisation parameters and the model (for example, a sinusoidal model). It is believed that the correlation parameters for given images could yet further improve the discrimination of objects, particularly moving objects in the case where the images at different angles of polarisation are temporally separated. In embodiments of the invention, the image processing unit is arranged to display an image on a visual display unit of the scene in such a way as to provide a graphical display of the correlation parameter(s) in the image, thus affording a user better discrimination of parts of the scene. It is however possible for the image processing unit to provide a non-graphical image output for example when used in a closed-loop system for object recognition for example.

The present invention provides a method, also according to the first aspect of the invention, for improving the discrimination between parts of a scene and for example for improving the discrimination of an object within a scene from other parts of the scene. The method may include use of some or all parts of the apparatus of the first aspect of the invention. The method includes a step of capturing at least one image from the scene at a first region of wavelengths, for example corresponding to a first waveband. The method includes a step of producing electronic data representing the image, such data including polarimetric information for elements of the image. The method includes a step of capturing at least one image from the scene at a second region of wavelengths, for example corresponding to a second waveband. The method includes a step of producing electronic data representing the image, such data including polarimetric information for elements of the image. The method includes a step of processing, preferably with the use of a computer processor, the electronic data to generate image data incorporating the polarimetric information to enable better discrimination of the object from the scene. The step of capturing at least one image from the scene may include capturing a plurality of successive images (for example at least four successive images) at different angles of polarisation. From those successive images, the method may include a step of calculating polarisation parameters (preferably a plurality of Stokes parameters) in respect of each respective element of the image. At least some of the polarisation parameters may then be used to allow better discrimination of the object from the scene. The method may include capturing a further image after the succession of images already captured and calculating polarisation parameters using some, but not all, of the previously captured images and the newly captured image. Thus, for each extra image captured new polarisation parameters may be calculated based on the most recent group of images (the four most recent images for example), by removing the oldest of the images from the group of images used to calculate the previous polarisation parameters and adding the most recent of the images to the group.

The method may incorporate any feature of the apparatus according to the first aspect of the invention. Thus, for example, the method may include a step of displaying an image on the visual display unit of the scene in such a way as to provide a graphical display of the polarimetric information in the image thus affording a user means for better discriminating between parts of the scene. The method may facilitate manual adjustment of the effect of the polarimetric information on the image displayed on a visual display unit.

The scene may be illuminated by a source of light (including non-visible light such as infra-red radiation) which is controlled as part of the performance of the method. Alternatively, the performance of the method may rely on the detection of radiation from the scene with the use only of ambient light, and/or light and radiation that is in any case present (i.e. without, for example, the use of an extra source of light directed onto the scene as a part of performance of the method).

The above-mentioned apparatus, and parts thereof, for displaying an image on a visual display unit of the scene in such a way as to provide a graphical display of the polarimetric information in the image thus affording a user better discrimination of parts of the scene, and the associated method, may have separate and independent application, for example, in applications in which image capture is performed within a single wave-band.

The present invention provides, according to a second aspect of the invention, an imaging apparatus improving discrimination between parts of scene, for example to improve the better discrimination of an object in a scene, possibly enabling such an object to be better detected. The imaging apparatus comprises at least one camera arranged to capture images from the scene at a region (for example the above-mentioned first region or second region) of wavelengths, and an image processing unit for processing the images so captured. The imaging apparatus is so arranged that the images detected by the at least one camera include polarimetric information that can be extracted by the image processing unit. The image processing unit is arranged to display an image on a visual display unit of the scene in such a way as to provide a graphical display of the polarimetric information in the image thus affording a user better discrimination of parts of the scene. Thus apparatus according to the second aspect of the invention may provide a means of enabling better discrimination of an object from a scene without needing to capture the image in more than one waveband. The apparatus according to the second aspect of the invention may incorporate any of the features of the first aspect of the invention. For example, said at least one camera may be arranged to capture images from the scene at a both of the above-mentioned first region and second region of wavelengths. The user may be able to select whether to display either, and optionally whether to display either or both simultaneously, (a) the image and associated polarimetric information from the data captured in the first wavelength region or (b) the image and associated polarimetric information from the data captured in the second wavelength region. There may be a step of facilitating manual adjustment of the amount of enhancement, of the image displayed, derived from the first image and/or the amount of enhancement derived from the second image and/or the amount of enhancement derived from a comparison between the first image and the second image.

The present invention provides a method, according to the second aspect of the invention, for affording a user better discrimination of parts of a scene, for example thus allowing the user to better discriminate an object, or target, from other parts of the scene. The method may include use of some or all parts of the apparatus of the second aspect of the invention. The method may include a step of capturing at least one image from the scene, for example at a region of wavelengths corresponding, for example, to the first waveband or the second waveband. The method may include a step of producing electronic data representing the image, such data including polarimetric information for elements of the image. The method may include a step of calculating with a computer processor a polarimetric parameter for each of the elements of the image. The method may include a step of displaying an image, for example on a visual display unit, of the scene. The image of the scene is advantageously displayed in such a way as to provide graphical feedback to the user of the polarimetric information in the image thus affording a user a means by which better discrimination of parts of the scene can be achieved. The method may include a step of graphically representing each element of the image in a manner dependent on one or more polarimetric parameters calculated for each such element. The method may facilitate manual adjustment of the effect of the polarimetric information/parameter(s) on the image so displayed so as to vary the polarimetric enhancement of the displayed image. The method may include a step of the user adjusting the effect of the polarimetric information/polarimetric parameter(s) on the image, so as to vary the enhancement of the image displayed or parts thereof.

The arrangement of the above-mentioned image processing unit (of the apparatus according to the first aspect of the invention) for calculating correlation parameters, thus potentially affording better discrimination of parts of the scene, and the associated method, may have separate and independent application, for example, in applications in which image capture is performed within a single waveband. Dual wave-band operation is preferred however as it facilitates a much greater range of manual adjustment of the enhancement of the image of the scene displayed by the visual display unit. For example, there may be manual adjustment of the enhancement of the image so displayed using information from a first image captured at a first region of wavelengths and a second image captured at a second region of wavelengths.

The present invention provides according to a third aspect of the invention, an imaging apparatus improving discrimination between parts of scene, for example to improve the better discrimination of an object in a scene, possibly enabling such an object to be better detected. The imaging apparatus comprises at least one camera arranged to capture images from the scene at a region (for example the above-mentioned first region or second region) of wavelengths and an image processing unit for processing the images so captured. The imaging apparatus is so arranged that the images captured by the at least one camera include a plurality of images (for example at least four images) captured at different angles of polarisation. Each of the images is advantageously divided into an array of elements (for example pixels) represented by data. The image processing unit is arranged to calculate from the data for each element, polarisation parameters (for example polarisation parameters from which the intensity of image captured corresponding to that element when the image is captured at a given polarisation can be predicted using a mathematical model, for example a sinusoidal model). The image processing unit is arranged to calculate for each element a correlation parameter, which indicates the fit between the actual image intensity detected for each element for each angle of polarisation with an expected image intensity (the expected image intensity being the image intensity that would be predicted for each element for each angle of polarisation according to the corresponding calculated polarisation parameters and the mathematical model).

The present invention provides a method, according to the third aspect of the invention, for calculating, and preferably graphically displaying, the correlation parameters. The method may include use of some or all parts of the apparatus of the third aspect of the invention. The method may include a step of capturing a plurality of images (for example at least four images) from the scene at different angles of polarisation, for example at a region of wavelengths corresponding, for example, to the first waveband or the second waveband. The method may include a step of producing electronic data representing individual elements (for example pixels) of each such image. The method may include a step of calculating from the data for each element, polarisation parameters from which the intensity of radiation detected at a given polarisation corresponding to that element can be predicted using a mathematical model (for example a sinusoidal model). The method may include a step of calculating for each element a correlation parameter. The correlation parameter preferably indicates the correlation between the actual image intensity detected for each element for each angle of polarisation at which measurements are made with the expected image intensity that would be predicted for each element for each angle of polarisation according to the corresponding calculated polarisation parameters and the mathematical model.

It will be appreciated that the steps of image capture of the methods of the invention may be performed in a different territory or at a different time from the image processing steps. Thus, it is within the scope of the present invention to carry out the steps of image capture separately from the steps of image processing. The present invention may thus have application in image processing of images that have been previously captured by other parties or by other apparatus. Any of the methods may include a step of initial despeckling the image to correct for elements (e.g. pixels) at which unusually high or low intensities are measured (suggestive of an anomaly or error).

The present invention also provides a processing unit programmed for use as the image processing unit of the imaging apparatus according to any aspect of the invention described or claimed herein or programmed to perform the method of any aspect of the invention described or claimed herein. For example, the processing unit may be programmed to cause one or more cameras to capture images, for example at different angles of polarisation and/or in different wavebands. The processing unit may be programmed to extract polarimetric information from data representing images detected. The processing unit may be programmed to use the polarimetric information, so ascertained, to enable better discrimination of the object from the scene. The processing unit may be programmed to compare a parameter concerning the polarisation of parts of a first image with an equivalent polarisation parameter of corresponding parts of a second image. The processing unit may be programmed to calculate a correlation parameter for each of a multiplicity of elements of an image. The processing unit may be programmed to display an image on a visual display unit of the scene in such a way as to provide a graphical display of the polarimetric information in the image thus affording a user a means for better discriminating between parts of the scene. The processing unit may comprise a plurality of distinct processors programmed to perform certain tasks performed by the processing unit.

The present invention also provides a computer program product so arranged, when installed on a computer processor, to form a processing unit according to any aspect of the invention described or claimed herein. The computer program product may be modularised. The computer program product may include a control module for controlling the image capture process. The computer program product may include an image processing module, for example for calculating one or more polarisation parameters. The computer program product may include a display module for controlling the display of one or more images on a visual display unit of the scene.

It will be appreciated that the imaging technology described herein may have application in relation to military and non-military use. Imaging systems are used in military applications for target recognition for example in missile guidance. A missile could incorporate an apparatus as described or claimed herein. A military vehicle could incorporate an apparatus as described or claimed herein. Emergency service vehicles, passenger vehicles, or other vehicles could usefully be equipped with imaging apparatus according to the present invention. There may also be application in relation to medical imaging. Imaging systems for use by an individual for other purposes could also incorporate aspects of the present invention. The methods of any aspect of the present invention may include a step of detecting an object (or target) from a scene. It is preferred that the imaging technology described herein is used, and arranged and configured for such use, in connection with improving discrimination of a macroscopic and separate object in a larger scene when viewed from a distance of greater than 5 m, preferably greater than 25 m.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

An embodiment of the present invention will now be described by way of example only with reference to the accompanying schematic drawings of which:

FIG. 3 is an equation referred to below; and

DETAILED DESCRIPTION

Figure 1:
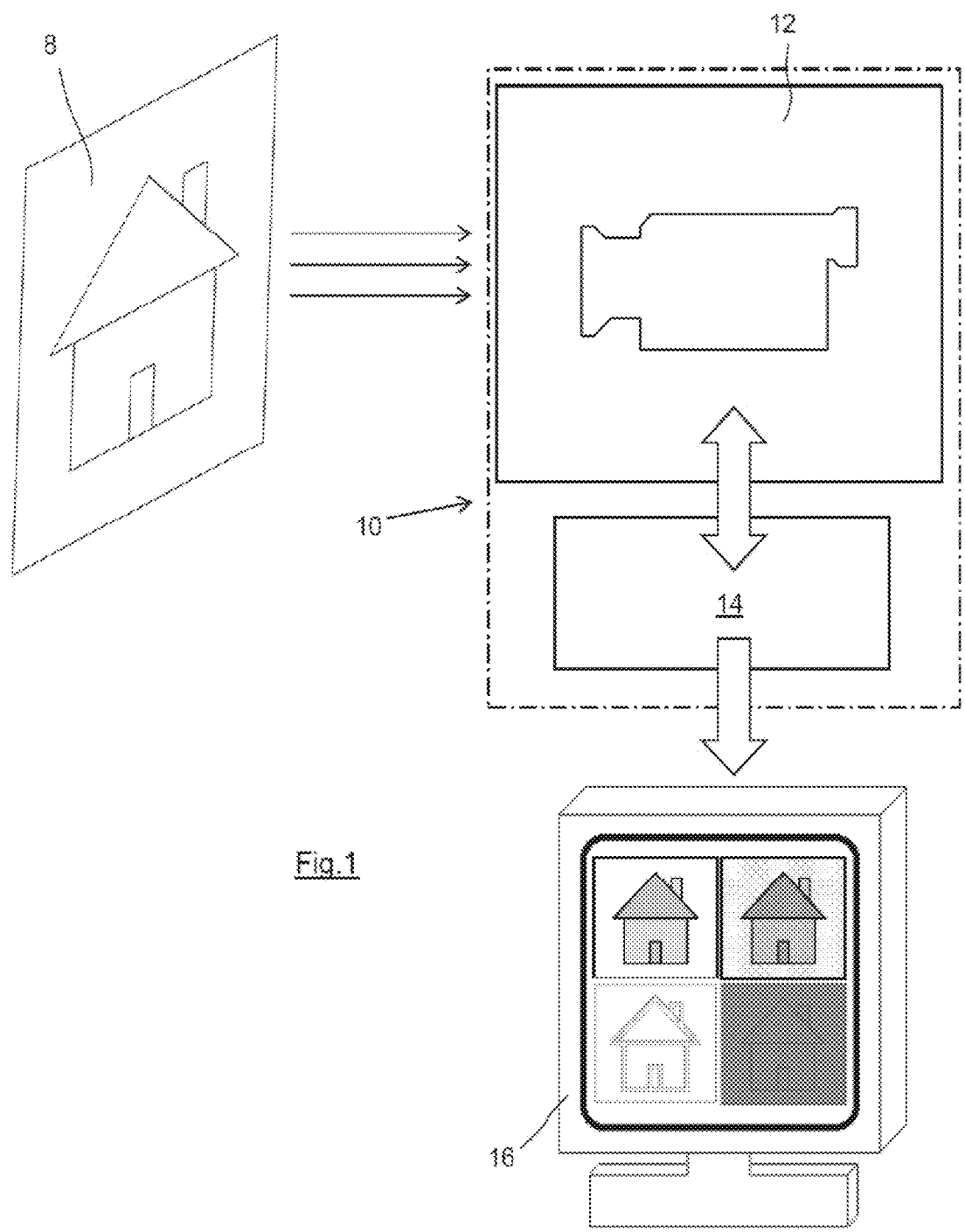
FIG. 1 is a schematic overview showing the function of an imaging apparatus according to the embodiment of the invention.

FIG. 1 shows schematically an embodiment of the present invention. Thus, FIG. 1 shows an imaging apparatus 10 for detecting an object in a scene 8. The apparatus 10 comprises a single camera unit 12 arranged to capture images from the scene 8. The camera 8 is controlled by a suitably programmed processing unit 14 which includes a control module for controlling operation of the camera, an image processing unit for processing the images captured by the camera and a module for providing a user interface to allow user interaction. The processing unit 14 is connected to a VDU 16 for displaying images of the scene. The camera unit 12 is arranged to capture images which are then processed by the processing unit 14 before being displayed on the VDU 16 to a user, the images displayed making use of polarimetric information to enable better discrimination between various part of the scene 8 (for example to allow better recognition of a target object from the rest of the scene and/or enhancing such a target or object).

Where there are people, cars, boats and general moving man-made objects in the scene, these will be referred to as scene 'targets'. The 'background' comprises the rest of the scene and comment will be made as to the composition of background; from natural structures, foliage and ground cover to man-made buildings and structures.

Figure 2:
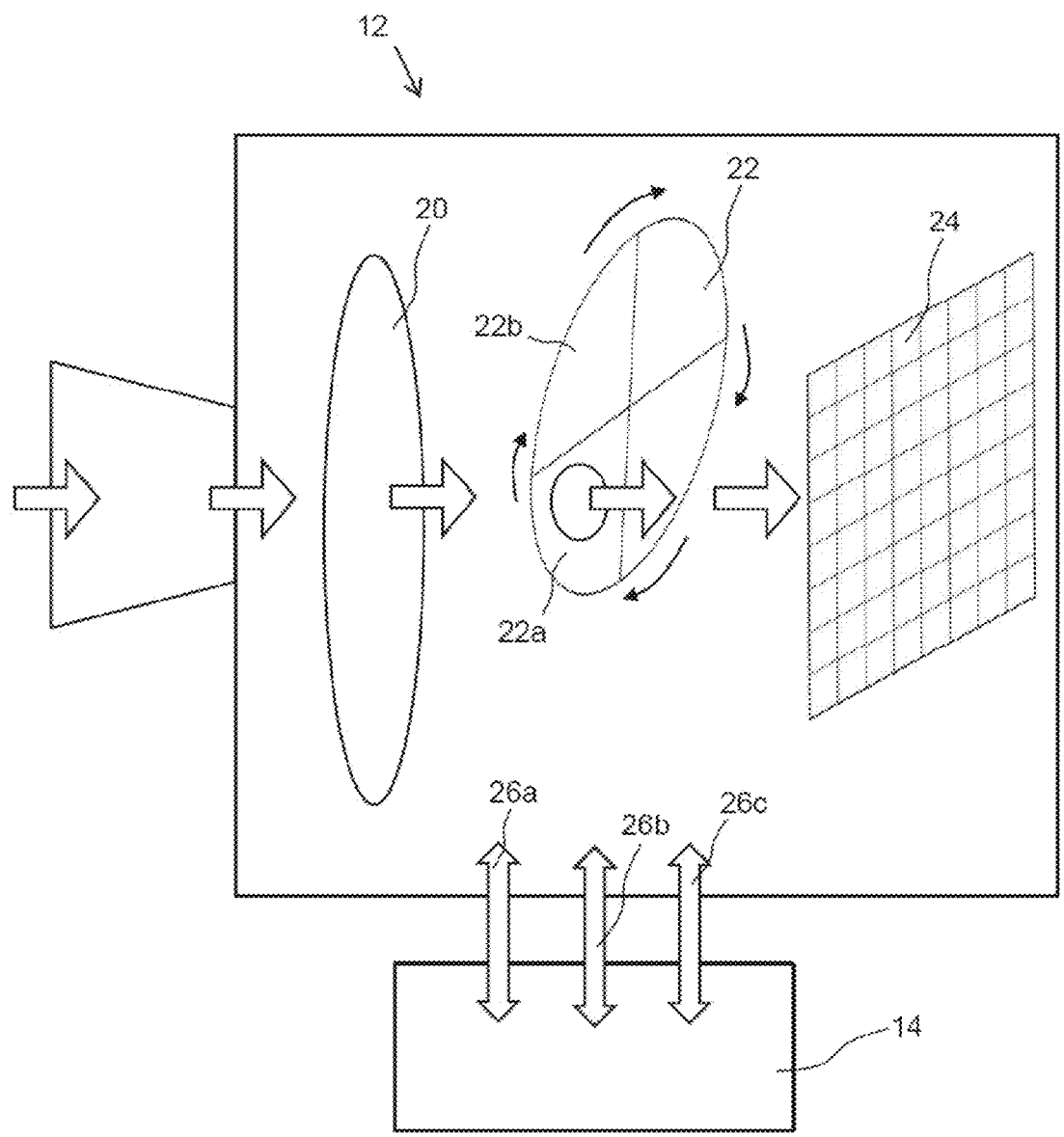
FIG. 2 is a schematic diagram showing parts of the imaging apparatus of FIG. 1.

FIG. 2 shows in further detail the parts of the camera unit 12 and associated processing unit 14. The camera unit 12 includes within the camera, a lens 20, a rotating polarising wheel 22, and a detector array 24. The camera unit 12 communicates with the processing unit 14 via channels 26a, 26b, 26c which provide for control, for example of the camera and of the rotating polarising wheel 22, and transfer of data from the camera to the processing unit 14 and its associated memory (not shown). The rotating polarising wheel 22 has four quadrants 22a, 22b, each quadrant, when aligned with the field of view, providing a polarisation filter of a particular angle relative to the camera. Each filter is in the form of a ZnSe wire-grid (holographic) polariser with an anti-reflection coating on the non-polarised face. The rotating polarising wheel 22 is rotated about its axis at a rate synchronised with the camera frame rate. The quadrant 22a, when positioned fully in the field of view acts as a 45 degree polarising filter. The quadrant 22b, when it moves fully into position acts as a 90 degree polarising filter, and so on. The processing unit 14 ensures that images are captured by the camera at the instant at which the quadrant is correctly positioned. As such, the rotation of the wheel and the capturing of the images is such that successive images are captured at 45 degree increases of angle of polarisation angle. Given that 0 degrees angle of polarisation is the same as 180 degrees; 45 degrees is the same as 225 degrees, and so on, a single rotation of the wheel, starting with any quadrant will result in four image captures equivalent to images at each of the four angles of polarisation at 0, 45, 90, 135 degrees.

The camera unit 12 is formed by a dual waveband camera utilising a CMT (Cadmium Mercury Telluride) full-TV detector array 24; a detector array that can image in both MW and LW thermal bands on spatially coincident pixels and at frame rates of 25 frames per second. The sensitivity of the camera to MW IR radiation is best from about 3.5 to 5 μm, whereas the sensitivity of the camera to LW IR radiation is best from about 8 to 9.5 μm.

The camera unit 12 is thus able to capture fully temporally and spatially registered real-time images simultaneous in both thermal detection bands. Such a camera can be sourced from Selex-ES—for example the Dual waveband InfraRed camera marketed by Selex under the name SLX-Condor II, which has the MWIR & LWIR focal place arrays configured one on top of the other (effectively co-located on the focal plane) so that the data captured is spatially coincident as well as being very closely synchronised in time (effectively simultaneously for practical purposes).

Thus with the dual waveband camera of the camera unit 12 and the use of a polarising wheel 22, images are captured once every 0.16 seconds at the four angles of polarisation (0, 45, 90, 135 degrees) in both the MW-IR band and the LW-IR band. The images are provided electronically by means of data representing the intensity of radiation received by each pixel element on the detector of the MW-IR band array or the LW-IR band array, as the case may be. The data files used can accommodate a large number of grey levels (substantially more than 5,000), potentially allowing for numerical analysis to a high degree of accuracy. However, the polarimetric content of radiation detected (detected after removal of the "pedestal") may for example have a sub-range of between 0 to 300 and 0 to 1000, depending on the scene, the conditions and the exact set-up, including for example factors such as energy contrast within the original scene and the angular setting of the polarising filter.

The image data is processed by the processing unit 14 in various ways to produce a collection of different images showing different features enhanced in different ways according to the polarimetric information captured, at the different wavelengths of radiation detected, by means of the image capture process. These images can be displayed on the VDU 16, possibly several images of the same scene each enhanced in a different way according to the user's selection (see four differently enhanced images schematically shown on the VDU 16 in FIG. 1).

In the present embodiment, there are three principal ways in which the images may be enhanced: (a) comparing polarisation information in an image detected in the MW-IR band with corresponding polarisation information in an image detected in the LW-IR band; (b) emphasising polarised light received by means of false-colouring the image according to a calculated polarimetric parameter such as angle of polarisation or proportion of polarisation; and (c) emphasising parts of the image by means of false-colouring according to a calculated correlation parameter. These three image enhancement techniques will now be described in further detail.

The image processor first calculates the polarisation in the scene in terms of the three Stokes parameters $S_0$, $S_1$, and $S_2$ in respect of each pixel for each waveband. The fourth Stokes parameter $S_3$, whilst shown below, relates to the proportion of circular polarisation and is not calculated in this embodiment. The Stokes parameters are calculated for each pixel as follows:

$$\begin{pmatrix} s_0 \\ s_1 \\ s_2 \\ s_3 \end{pmatrix} = \begin{bmatrix} \frac{1}{2} \cdot (I_0 + I_{90} + I_{45} + I_{135}) \\ I_0 - I_{90} \\ I_{45} - I_{135} \\ I_{RCP} - I_{LCP} \end{bmatrix}$$

where the four intensity values, $I_\theta$ represents the intensity of radiation detected at the detector pixel when the polarising filter has an angle of $\theta$. By measuring the intensity at each pixel under polarisation angles of 0°, 45°, 90° and 135° all of the information needed to define the overall intensity of the source radiation, the proportion of linearly polarised light and the orientation (angle) of the linearly polarised component can be derived. The orientation of the linear polarisation component (Ø)—also referred herein as the angle of polarisation—at each pixel is computed as follows:

$$\phi = \frac{1}{2} \cdot \mathrm{atan}\left(\frac{s_2}{s_1}\right) \quad (A)$$

$$\begin{cases} \phi = +\pi/4 & \text{if } S1 = 0 \text{ \& } S2 > 0 \\ \phi = -\pi/4 & \text{if } S1 = 0 \text{ \& } S2 < 0 \\ \phi = (A) & \text{if } S1 > 0 \\ \phi = (A) + \pi/2 & \text{if } S1 < 0 \end{cases}$$

The proportion of the linear polarised component of the total intensity ($P_{linear}$)—effectively a normalised value for the ratio of polarised to non-polarised energy in the scene (also referred to herein as the proportion of polarisation)—is calculated for each pixel as follows:

$$P_{linear} = \frac{\sqrt{s_1^2 + s_2^2}}{s_0}$$

The image processing unit compares (either by calculating a ratio or a difference between them) the proportion of polarisation of each pixel of the MW-IR band image with the proportion of polarisation of each corresponding pixel of the LW-IR band image. The image processing unit also compares (either by calculating a ratio or a difference between them) the angle of polarisation at each pixel of the MW-IR band image with the angle of polarisation at each corresponding pixel of the LW-IR band image. Thus, there is a comparison of a polarisation parameter (proportion of polarisation or polarisation angle) of each pixel in the image detected in the MW-IR band with a corresponding polarisation parameter of each corresponding pixel in the image detected in the LW-IR band.

The comparison (ratios or differences) of the polarisation parameters (polarisation angle and proportion of polarisation) at each pixel are graphically represented on the VDU with the user being able to change the type of polarisation parameters being compared, or the weight given thereto, via a suitable user interface (for example via on-screen buttons, toggle switches and/or sliders). For example, the user may choose to show an image showing the overall intensity of radiation received in one of the three RGB channels, to overlay with an image representing the polarisation angle of radiation received in another of the three RGB channels and to overlay with a further image representing the proportion of polarisation of radiation received in the remaining of the three RGB channels. The user may then be permitted to vary the weight given to each of those three overlaid images, giving control over how the—otherwise monochromatic (typically shown in grey-scale)—is shown as a full (false-) colour image representative of the scene. The user may be permitted to compare or enhance images using any polarisation parameters, for example comparing images in the same waveband but at different polarisations or comparing images in different wavebands according to the values of a given polarisation parameter accorded to the pixels of the respective images. Such comparisons/enhancements may create a data array that can be viewed as a monochromatic image. Three monochromatic images (from such comparisons/enhancements) can be combined using the RGB channels to give a full colour image.

The following is a non-exhaustive list of the polarisation parameters that could be compared as between the MW-IR band image and the LW-IR band image:

intensity of radiation detected at polarisation at an angle of 0 degrees
intensity of radiation detected at polarisation at an angle of 45 degrees
intensity of radiation detected at polarisation at an angle of 90 degrees
intensity of radiation detected at polarisation at an angle of 135 degrees
angle of polarisation of linearly polarised radiation detected
proportion of polarisation
Stokes parameter $S_0$ (overall intensity)
Stokes parameter $S_1$, and
Stokes parameter $S_2$.

Full control is given to the user as to which variables to compare and what weighting or comparison is chosen. (It will be appreciated that fewer options may be presented to the user for certain applications).

One example output might be to represent the magnitude of polarisation energy (the peak linear intensity—"$I_{max\_linear}$"—see below for formula) in each waveband as a separated RGB colour channel, in order to depict the relative strength of polarised returns in each waveband. The third channel (green in this case) is an average of the two single waveband channels in order to nullify its contribution. A normalisation process is conducted for each of the single wavebands such that the contribution of each waveband is equalised and not dependent on the absolute magnitude of energy due to the variation in the stare time of each waveband.

An image can be created so that the degree (or relative magnitude) of polarisation in the image, on a pixel by pixel basis, as defined by $I_{max\_linear}$ is coloured accordingly. The intensity of green could be proportional to the relative magnitude of polarised radiation, such that bright green indicates a pixel with a (relatively) large component of polarised radiation; red could represents the magnitude of the non-polarised radiation such that the two colours work to enhance the polarisation content. The blue colour channel could be proportional to the red channel in order to have no additional contribution.

As another example of a possible graphical output, the absolute difference between the angles of polarisation ($\Phi$) in each waveband, can be superimposed onto a single waveband image as a false colour. For example, a monochrome IR image is under-laid and the differences in angle of polarisation, as between corresponding pixels in the images from each waveband, can be superimposed on top in a different colour chosen in accordance with the difference so calculated.

Alternatively, or additionally, images and/or polarimetric information can be compared within a single waveband of measurement. Thus, polarised light received can be emphasised by means of false-colouring on a grey-scale image (for example—grey-scale coloured according to the value of $S_0$) according to a calculated polarimetric parameter such as angle of polarisation or proportion of polarisation. A full colour image can be displayed in which different colours are used to display polarimetric information in the image thus affording a user better discrimination of parts of the scene. A monochrome image ($S_0$ values for example) from a single waveband can be further coloured with a colour depending on the polarisation angle value accorded to the pixels of the image, such that the colour bar is circular (i.e. so that angles centred on 0° and 180° will have the same response).

Alternatively, or additionally, parts of the image may be emphasised by means of false-colouring according to a calculated correlation parameter (as defined by the parameter Cf according to the formulae shown in FIG. 3) within a single waveband of measurement. The correlation parameter effectively represents the 'goodness of fit' of the data to a theoretical sinusoid. There now follows an explanation of how the correlation parameter is calculated for a given pixel.

The peak linear intensity is given by:

$$I_{max\_linear} = \sqrt{s_1^2 + s_2^2}$$

Figure 4:
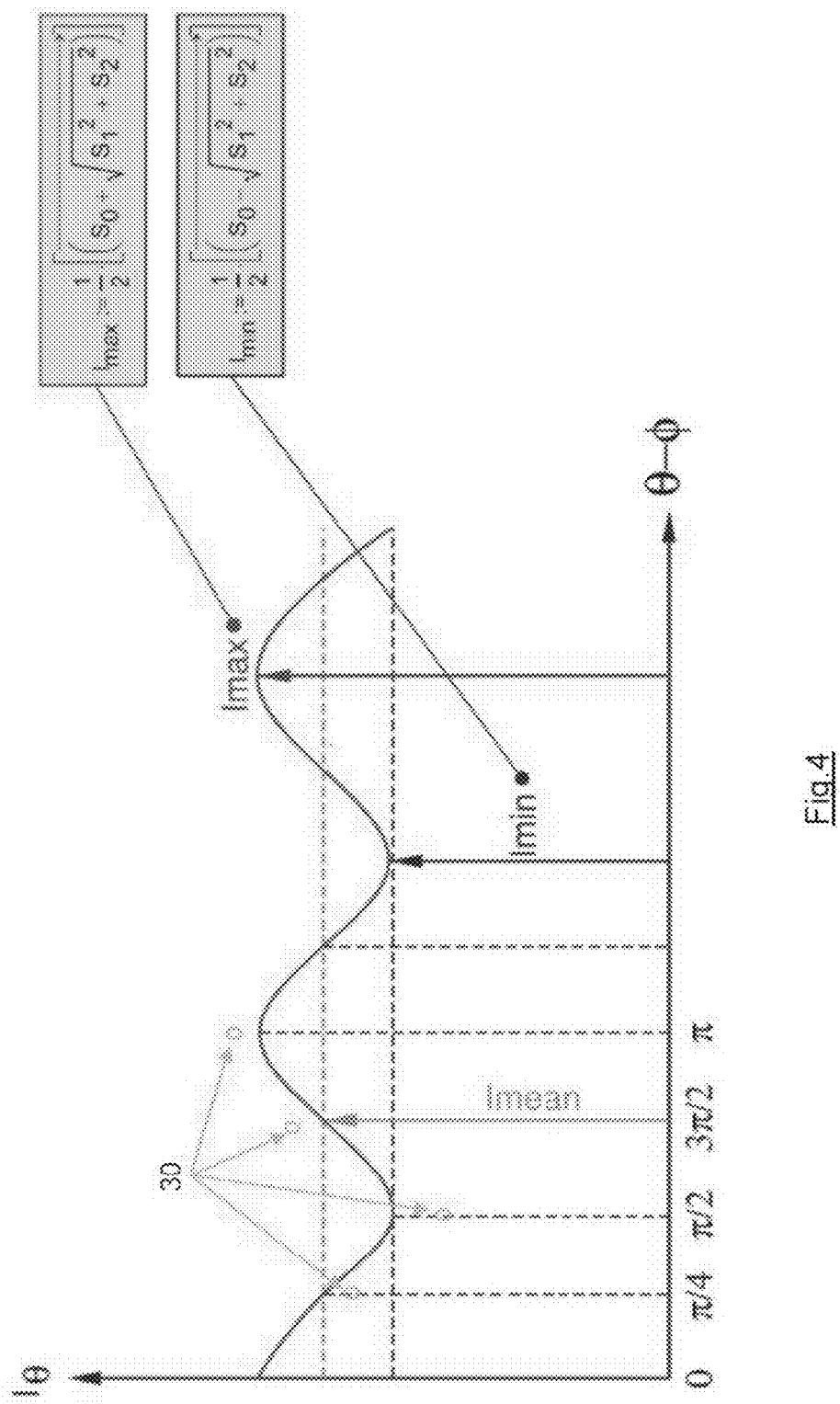
FIG. 4 is a graph illustrating the use of correlation parameters according to the embodiment of the invention.

With reference to FIG. 4, if the predicted overall intensity $I_\theta$ is graphed as a function of θ where θ represents the angle of the polarisation filter via which radiation is admitted into the camera, the resultant plot has the form of a sine wave representing the linearly polarised component superimposed on a constant plateau (the pedestal) signifying the 'dc' intensity of the other radiation. The processing unit has already calculated from the data for each pixel the Stokes parameters, from which $I_{max}$ and $I_{min}$ may be derived (see FIG. 4). The actual data points 30 measured are shown on the graph of FIG. 4 and show that the actual measurements deviate from the predicted intensity $I_\theta$ curve.

The processing unit calculates for each pixel an expected image intensity value ($I_{calc}$ in FIG. 3) as a predicted value for each pixel for each angle of polarisation a according to the formula shown in FIG. 3. This is compared with the actual values measured by summing the square of the differences to provide the value u which provides a measure of the variance between the measured values and the predicted values according to the model (a measure of goodness of fit). This is then normalised to produce the correlation parameter, Cf, which is a single value indicating the correlation between the actual image intensity detected for each pixel for each angle of polarisation at which measurements are made with the predicted image intensity at each pixel for each angle of polarisation. In the formulae shown in FIG. 3, it will be seen that the fraction 'u/v' is subtracted from unity to define Cf as a unitless measure of correlation ranging from 0 to 1. Thus, absolute correlation would yield Cf=1 whereas at zero correlation would yield Cf=0. The correlation parameter will then be low in parts of an image where there has been movement. If the correlation parameter is employed for example to weight the corresponding '$I_{max\_linear}$' value, it will cause the movement to be shown as a dark area on the displayed image.

The correlation parameter, Cf, enables the presence of motion in polarising surfaces, such as water, to be detected and displayed. For a motionless scene, for each given pixel, the theoretical variation in the measured $I_\theta$ values corresponding to 0°, 45°, 90° & 135° would be exactly sinusoidal. However, in respect of moving surfaces or sources, for which the irradiance properties are changing with time, the actual measurements will deviate from the predicted values. This variance may not be due to polarisation characteristics alone but may also be caused by the modulation of the reflected radiation as well. Such a scheme is useful in a naval environment in detecting for instance disturbances of the water surface due to the existence of currents or as a consequence of the wake of a vessel. It will be appreciated that, in this embodiment, the sequential capturing of the four constituent images is what provides the ability to observe the time dependent effects by means of the correlation parameter.

It is believed that the strongest image discrimination will typically be available primarily in the polarised LWIR image; however there may be occasions when this is reversed so that the polarised MWIR images will provide the best opportunity for discrimination. There will be occasions when the performance in both wavebands will be comparable (roughly equal). Use of both wavebands is therefore advantageous.

A reference image may be taken of the scene, for example with a visible light camera (preferably separate from the camera unit 12 shown in the Figures). An image could be formed by superimposing onto such a reference image an image representing the angle of polarisation that can itself be varied to emphasize regions that have a strong polarimetric signature. In another example, the degree of linear polarisation could be superimposed onto a reference image. The degree of linear polarisation for both MWIR and LWIR could both be superimposed, using the green & red channels, respectively onto a reference image that represents the 'dc' level of unpolarised energy.

It will be appreciated that there may be many factors which may affect the way a particular scene responds to the presence of a polariser at any given orientation. Such factors as the properties of the material itself (composition, surface smoothness, reflectivity, emissivity, temperature, etc.), the weather conditions (cold, hot, overcast, foggy, etc.), the position of the sun and time of day and the orientation of the target object could all be cited as variables. Indeed drawing absolute conclusions based on the interpretation of the physical properties of a region within an image that lead to a particular result is difficult.

It is believed however that dual band polarimetric imaging will provide significant advantages over the imaging systems of the prior art. The use of dual-band allows the recording of imagery where information for a particular target is dominant in either one of the two bands (MW or LW). Which band dominates is a complex function of material, weather and lighting conditions, some of which may not be known prior to the selection and deployment of a system. It is believed that the highest DOLP (Degree of Linear Polarisation) measurements will be those that result from a reflection from a metallic or glass surface (or other smooth surfaces). Such surfaces are typically characteristic of man-made objects. It may be the case that the DOLP will be dominant in one but not the other of the LW and the MW band.

It should be noted that manmade objects appear to have stronger polarisation characteristics than naturally occurring ones. This should allow a general discrimination benefit for military systems and may provide a solution to the thermal inversion (or cross-over) problem where IR target signatures may merge completely into the background at certain times of the day, usually near dawn and dusk. To date, analysis has also indicated that by understanding the engagement conditions of a scenario such as time of a day and net position and angle of trajectory, it should be possible to utilise a polarimetric database in order to present the operator (or indeed a system based on a closed-loop algorithm) with a polarimetric image that is tuned to enhance particular features in the scene and thus generate a stronger target to background contrast.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Use could be made of the circular polarisation parameter that is included in the algorithm discussion above. A quarter-waveplate retarder could be provided to extract the relevant measurements to calculate the circular polarisation parameter, by inserting the quarter waveplate between the source and the polarising filter, and then taking readings at 45° and 135°, thus indicating directly the intensity components of right and left
hand circularly polarised (IRCP & ILCP) light. From these, the proportion of the circular polarised components of the total intensity, $P_{circular}$ could be calculated as $$P_{circular} = \frac{s_3}{s_0}$$

The peak circular intensity is given by:

$$I_{circular} = S_3$$

Instead of using a separate polariser, a camera with integrated polarising function could be employed. A quantum well infrared (QWIP) photodetector could be configured such that the detector elements each have a linear grating formed thereon, a set of four (in 2×2 formation) having gratings at 0, 45, 90, 135 degrees, and the detector array being formed of an array of many such detector elements. Such a detector is described in the paper by Parsons, et al, "A LWIR Multi spectral/Polarimetric Imager" ($6^{th}$ EMRS DTC Technical Conference—Edinburgh 2009—B").

Measurements and display of polarimetric parameters could use on a single band of wavelengths. More than two band of wavelengths could also be used.

The comparison of polarimetric data, and/or the visual emphasising of the polarimetric information, could be achieved simply by displaying a sequence of images, not necessarily in full colour, where the polarimetric content of a pixel may be represented by differences, for example in brightness, of one or more pixel(s) between one image and the corresponding pixel(s) in a subsequent image. Such differences may be perceived by the user as parts of the image flashing or pulsating when viewed in quick succession.

Other embodiments may have application without a need to provide any detailed graphical feedback on polarisation parameters on a VDU to a user. The image processing could instead by used for target recognition in a closed-loop image processing module. Feedback could simply be in the form of highlighting a recognised target or potential target. In an automated target seeking device, there may need to be no feedback to any user in operation the device according certain aspects of the present invention.

There may be five segments on the polarising wheel instead of four quadrants, the extra segment having no polarising filter, such that a non-polarised image is taken separately (which will result in higher intensity radiation, and potentially better contrast of image, being detected, as a result of the lower attenuation possible without a filter in the beam path). A visible light image may be captured at the same time as capturing the infra-red images, possibly via a different camera unit.

More the one camera may be used. For example, a beam splitter may divert radiation to two thermal imaging cameras one being a MWIR (3-5 µm) unit and the other being a LWIR (8-11 µm) camera unit. Such cameras could use cooled technology CMT FPA detector arrays. In order to afford better transmission, different polariser substrates can be used according to waveband, for example for the MWIR band camera, the polariser substrate could be ZnSe, whilst for LWIR the polariser substrate could be BaF2.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An imaging apparatus for discrimination between parts of a scene, the imaging apparatus comprising:
    at least one camera arranged to capture a first image from the scene at a first region of wavelengths, corresponding to a first waveband, and a second image from the scene at a second region of wavelengths, corresponding to a second distinct waveband;
    an image processing unit for processing the images so captured; and
    a visual display unit, wherein:
the visual display unit is configured to display an image of the scene;
the imaging apparatus is so arranged that the images detected by the at least one camera include polarimetric information that can be extracted by the image processing unit; and
the image processing unit is arranged to extract polarimetric information from both the first and second images and to produce a third image of the scene for display by the visual display unit, the third image comprising complementary information from the polarimetric information extracted from both the first and second images, the complementary information, when displayed by the visual display unit, providing discrimination in the third image between parts of the scene.

2. The apparatus according to claim 1, wherein the image processing unit is arranged to display an image on the visual display unit of the scene in such a way as to provide a graphical display of the polarimetric information in the image, thus affording a user better discrimination of parts of the scene.

3. The apparatus according to claim 1, wherein the imaging apparatus is so arranged that there are more than five different polarisation parameters or other variables available for a user to adjust so as to provide different types and/or amounts of enhancement to the image displayed by the visual display unit.

4. The apparatus according to claim 1, wherein the apparatus includes a user interface via which the effect on at least part of an image of the scene displayed on the visual display unit of any one or more of a plurality of polarimetric parameters can be adjusted by a user.

5. The apparatus according to claim 1, wherein
the first waveband covers multiple wavelengths in the region from 3 to 6 µm,
the second waveband covers multiple wavelengths in the region from 7.5 to 12 µm, and
neither the first waveband nor the second waveband covers wavelengths in the region from 6 to 7.5 µm, the first and second wavebands thus being distinct and spectrally spaced apart from each other.

6. The apparatus according to claim 1, wherein the imaging apparatus comprises a polarisation filter unit configurable to admit, at any one of at least four different angles of polarisation, the radiation from the scene captured by the camera to form an image.

7. The apparatus according to claim 6, wherein the polarisation filter unit is configured to step through different angles of polarisation such that, in respect of each region of wavelengths, at least four images are captured at those angles of polarisation over a period of time that is less than one second.

8. The apparatus according to claim 1, wherein the image processing unit is arranged to compare the proportion of polarisation of parts of the first image with the proportion of polarisation of corresponding parts of the second image.

9. The apparatus according to claim 1, wherein the image processing unit is arranged to compare the angle of polarisation of parts of the first image with the angle of polarisation of corresponding parts of the second image.

10. The apparatus according to claim 1, wherein
the imaging apparatus is so arranged that the images captured by the at least one camera include at least four images captured at different angles of polarisation, each of the images being divided into an array of elements represented by data,
the image processing unit is arranged to calculate from the data for each element, polarisation parameters from which the intensity of image captured corresponding to that element when the image is captured at a given polarisation can be predicted using a sinusoidal model,
the image processing unit is arranged to calculate for each element a correlation parameter, which indicates the correlation between the actual image intensity detected for each element for each angle of polarisation at which measurements are made with the expected image intensity that would be predicted for each element for each angle of polarisation according to the corresponding calculated polarisation parameters and the sinusoidal model.

11. A processing unit comprising hardware and programmed for use as the image processing unit of the imaging apparatus according to claim 1.

12. A computer program product stored in a non-transitory computer readable medium, the computer program product arranged, when installed on a computer processor, to form the image processing unit according to claim 1.

13. A method of improving the discrimination of an object within a scene from other parts of the scene, the method includes the following steps:
capturing a first image from the scene at a first region of wavelengths corresponding to a first waveband, and a second image from the scene at a second region of wavelengths, corresponding to a second distinct waveband, and producing electronic data representing a third image of the scene, such data including polarimetric information comprising complementary information for elements of the image extracted from both the first and second images,
displaying the third image on a visual display unit in such a way as to provide a graphical display of the complementary information in the image, the complementary information providing discrimination in the third image between parts of the scene, and
facilitating manual adjustment of the effect of the polarimetric information on the image so displayed so as to vary the polarimetric enhancement of the image displayed.

14. The method according to claim 13, wherein the step of capturing at least one image from the scene includes capturing at least four successive images at different angles of polarisation, and from those successive images calculating Stokes parameters in respect of each respective element of the image and at least some of the Stokes parameters are used to allow better discrimination of the object from the scene.

15. The method according to claim 13, wherein the method includes a step of calculating with a computer processor one or more polarimetric parameters for each of the elements of at least one of the first and second images, and wherein
the step of displaying the third image of the scene on the visual display unit includes graphically representing each element of the at least one image in dependence on the one or more polarimetric parameters so calculated for each such element.

16. The method according to claim 13, wherein the method includes steps of
capturing at least four images from the scene at different angles of polarisation, producing electronic data representing individual elements of each such image, calculating from the data for each element, polarisation parameters from which the intensity of radiation detected at a given polarisation corresponding to that element can be predicted using a sinusoidal model, and calculating for each element a correlation parameter, which indicates the correlation between the actual image intensity detected for each element for each angle of polarisation at which measurements are made with the expected image intensity that would be predicted for each element for each angle of polarisation according to the corresponding calculated polarisation parameters and the sinusoidal model, the correlation parameters providing the complementary information for the third image, and wherein the step of facilitating manual adjustment of the effect of the information on the image so displayed allows for display graphically of the correlation parameters for the elements of the image.

17. The method according to claim 13, wherein the complementary information is provided at least in part by reflected ambient energy and polarised energy from object emission.

18. The method according to claim 13, wherein the visual display unit has color channels and the step of displaying the third image comprises overlaying the scene in the image with the polarimetric information, using separate color channels for the scene and the polarimetric information.

19. The apparatus according to claim 1, wherein the complementary information is provided at least in part by reflected ambient energy and polarised energy from object emission.

20. The apparatus according to claim 1, wherein the visual display unit has color channels and the image processing unit is arranged to enhance a displayed image with polarimetric information by use of separate color channels for the displayed image and the polarimetric information.

* * * * *